(12) United States Patent
Liu et al.

(10) Patent No.: US 7,751,332 B2
(45) Date of Patent: Jul. 6, 2010

(54) DATA ROUTING METHOD AND APPARATUS

(75) Inventors: Yong Liu, San Jose, CA (US); Eun Il Seo, Hwaseong-si (KR); Jin Young Yang, Seoul (KR); Myung Jong Lee, New York, NY (US); Xuhui Hu, New York, NY (US)

(73) Assignees: Samsung Electronics Co., Ltd., Suwon-si (KR); The Research Foundation of the City University of New York, New York, NY (US)

( * ) Notice: Subject to any disclaimer, the term of this patent is extended or adjusted under 35 U.S.C. 154(b) by 230 days.

(21) Appl. No.: 11/923,777

(22) Filed: Oct. 25, 2007

(65) Prior Publication Data

US 2008/0101244 A1 May 1, 2008

Related U.S. Application Data

(60) Provisional application No. 60/854,087, filed on Oct. 25, 2006.

(30) Foreign Application Priority Data

Jul. 18, 2007 (KR) .................... 10-2007-0071939

(51) Int. Cl.
*H04L 12/28* (2006.01)
(52) U.S. Cl. .................... 370/238; 370/251; 370/254; 709/241
(58) Field of Classification Search .............. 370/251
See application file for complete search history.

(56) References Cited

U.S. PATENT DOCUMENTS

| 6,633,544 | B1 * | 10/2003 | Rexford et al. ............. 370/238 |
| 2003/0161330 | A1 | 8/2003 | Umeda ....................... 370/400 |
| 2004/0071082 | A1 * | 4/2004 | Basu et al. .................. 370/229 |
| 2004/0073702 | A1 * | 4/2004 | Rong ........................... 709/241 |
| 2006/0002312 | A1 | 1/2006 | Delattre et al. ............. 370/254 |

FOREIGN PATENT DOCUMENTS

| JP | 2004-282269 A1 | 10/2004 |
| KR | 10-2004-0110646 A | 12/2004 |
| KR | 10-2005-0023372 A | 3/2005 |
| KR | 10-2006-0087478 A | 8/2006 |
| KR | 10-2006-0116692 A | 11/2006 |

\* cited by examiner

*Primary Examiner*—Chi H. Pham
*Assistant Examiner*—Shick Hom
(74) *Attorney, Agent, or Firm*—Sughrue Mion, PLLC

(57) ABSTRACT

A data routing method and system, the data routing method including: locating a destination node using a destination locating packet; establishing a preliminary route including anchor nodes based on a route where the destination locating packet is transmitted to the destination node; determining a link cost between neighbor nodes of each of the anchor nodes, and also between the anchor nodes and the neighbor nodes of each of the anchor nodes; generating minimum cost information with respect to a route consuming a minimum cost from the destination node to a source node using the link cost; and forming a data route from the destination node to the source node using the minimum cost information.

19 Claims, 6 Drawing Sheets

DATA ROUTING METHOD AND APPARATUS

CROSS-REFERENCE TO RELATED APPLICATION

This application claims the benefit under 35 U.S.C. §119(e) of U.S. Provisional Application No. 60/854,087, filed on Oct. 25, 2006, in the U.S. Patent and Trademark Office, and under 35 U.S.C. §119(a) of a Korean Patent Application No. 10-2007-0071939, filed on Jul. 18, 2007, in the Korean Intellectual Property Office, the entire disclosure of both of which are hereby incorporated by reference.

BACKGROUND OF THE INVENTION

1. Field of the Invention

Methods and apparatuses consistent with the present invention relate to a routing protocol, and more particularly, to a data routing method and apparatus which may optimize a data route considering a link cost between nodes.

2. Description of Related Art

Currently, communication technologies in wire communications as well as wireless communications are being rapidly developed. Particularly, the number of users using wireless communication services such as the Internet has dramatically increased, and users' desire to use communication services anytime and anywhere has increased. Also, pocket-sized and multi-functional mobile terminals become popular, and thus wireless communication services will be more widely used.

However, communication bandwidth in wireless networks is limited, and a small amount of energy is required to be used for communications. Also, most wireless networks are configured to be able to communicate with each other using multi-hop routings between nodes without help from particular base networks. In such environments, how routes are established between nodes is critical. Particularly, since each node dynamically moves in ad-hoc networks, it is crucial to efficiently establish and maintain routing paths from source nodes to destination nodes.

Generally, routing protocols exist to discover optimal routes for transmitting packets. 'Hop counts' are mainly used as the standards for selecting routing paths. Specifically, routes having minimum hop counts from among routes between source nodes and destination nodes are selected as optimal routing paths.

When minimum hop counts are the standards for selecting routing paths, average distances between selected hops increase, and thus signal to noise ratio (SNR) increases. Accordingly, packet loss may not be prevented.

Also, although the number of hop counts is identical, link states between nodes may be different. Accordingly, it is ineffective to uniformly apply minimum hop counts to the standards for selecting routing paths, since faulty wireless links between nodes included in minimum hop counts may exist. Specifically, packet loss may increase, and power may be wasted. Accordingly, hop counts and link costs of each wireless link are required to be considered to select optimal routing paths.

Thus, a data routing method and apparatus which may optimize a selected data route based on a hop count is required.

SUMMARY OF THE INVENTION

An aspect of the present invention provides a data routing method and apparatus which establishes an optimal data route by considering a link cost.

Another aspect of the present invention also provides a data routing method and apparatus which establishes a route consuming a minimum link cost as a data route, and thereby may establish an optimal data route.

Another aspect of the present invention also provides a data routing method and apparatus which generates cost information including information about a minimum cost spanning tree (MCST) using a Dijkstra algorithm, and thereby may efficiently optimize a data route.

Another aspect of the present invention also provides a data routing method and apparatus which considers a link cost between nodes within a predetermined range, and thereby may reduce an overhead due to optimizing a data route.

Another aspect of the present invention also provides a data routing method and apparatus which consumes a minimum energy to optimize a data route, and thereby may establish an optimal data route using a small amount of energy.

According to an aspect of the present invention, there is provided a data routing method, the data routing method including: locating a destination node using a destination locating packet; establishing a preliminary route including anchor nodes based on a route where the destination locating packet is transmitted to the destination node; determining a link cost between neighbor nodes of each of the anchor nodes, and also between the anchor nodes and the neighbor nodes of each of the anchor nodes; generating minimum cost information with respect to a route consuming a minimum cost from the destination node to a source node using the link cost; and forming a data route from the destination node to the source node using the minimum cost information.

In an aspect of the present invention, the generating of the minimum cost information may generate the minimum cost information with respect to the route consuming the minimum cost from the destination node to the source node using a Dijkstra algorithm.

In an aspect of the present invention, the generating of the minimum cost information includes: generating, by a downstream anchor node, downstream cost information using a link cost between neighbor nodes of the downstream anchor node, and also between the downstream anchor node and the neighbor nodes of the downstream anchor node; updating, by an upstream anchor node, the downstream cost information using a link cost between neighbor nodes of the upstream anchor node, and also between the upstream anchor node and the neighbor nodes of the upstream anchor node, the upstream anchor node being adjacent to the downstream anchor node; and generating, by the upstream anchor node, the minimum cost information by successively updating the downstream cost information.

In an aspect of the present invention, the neighbor nodes of each of the anchor nodes may be located within a predetermined number of hops from each of the anchor nodes.

In an aspect of the present invention, the neighbor nodes of each of the anchor nodes may be located within two hops from each of the anchor nodes.

In an aspect of the present invention, the determining of the link cost may determine the link cost where a link state between nodes is considered.

In an aspect of the present invention, the forming of the data route includes: transmitting, by the source node, a route formation packet corresponding to the minimum cost information to the anchor nodes; and selecting, by the destination node, the data route by transmitting a reply packet in response to the route formation packet.

In an aspect of the present invention, the establishing of the preliminary route may establish the preliminary route to include a minimum number of anchor nodes.

In an aspect of the present invention, the locating of the destination node may locate the destination node by broadcasting the destination locating packet by the source node.

According to another aspect of the present invention, there is provided a data routing apparatus, the data routing apparatus including: a destination node locating unit which locates a destination node using a destination locating packet; a preliminary route establishment unit which establishes a preliminary route including anchor nodes based on a route where the destination locating packet is transmitted to the destination node; a link cost determination unit which determines a link cost between neighbor nodes of each of the anchor nodes, and also between the anchor nodes and the neighbor nodes of each of the anchor nodes; a minimum cost information generation unit which generates minimum cost information with respect to a route consuming a minimum cost from the destination node to a source node using the link cost; and a data route formation unit which establishes a data route from the destination node to the source node using the minimum cost information.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
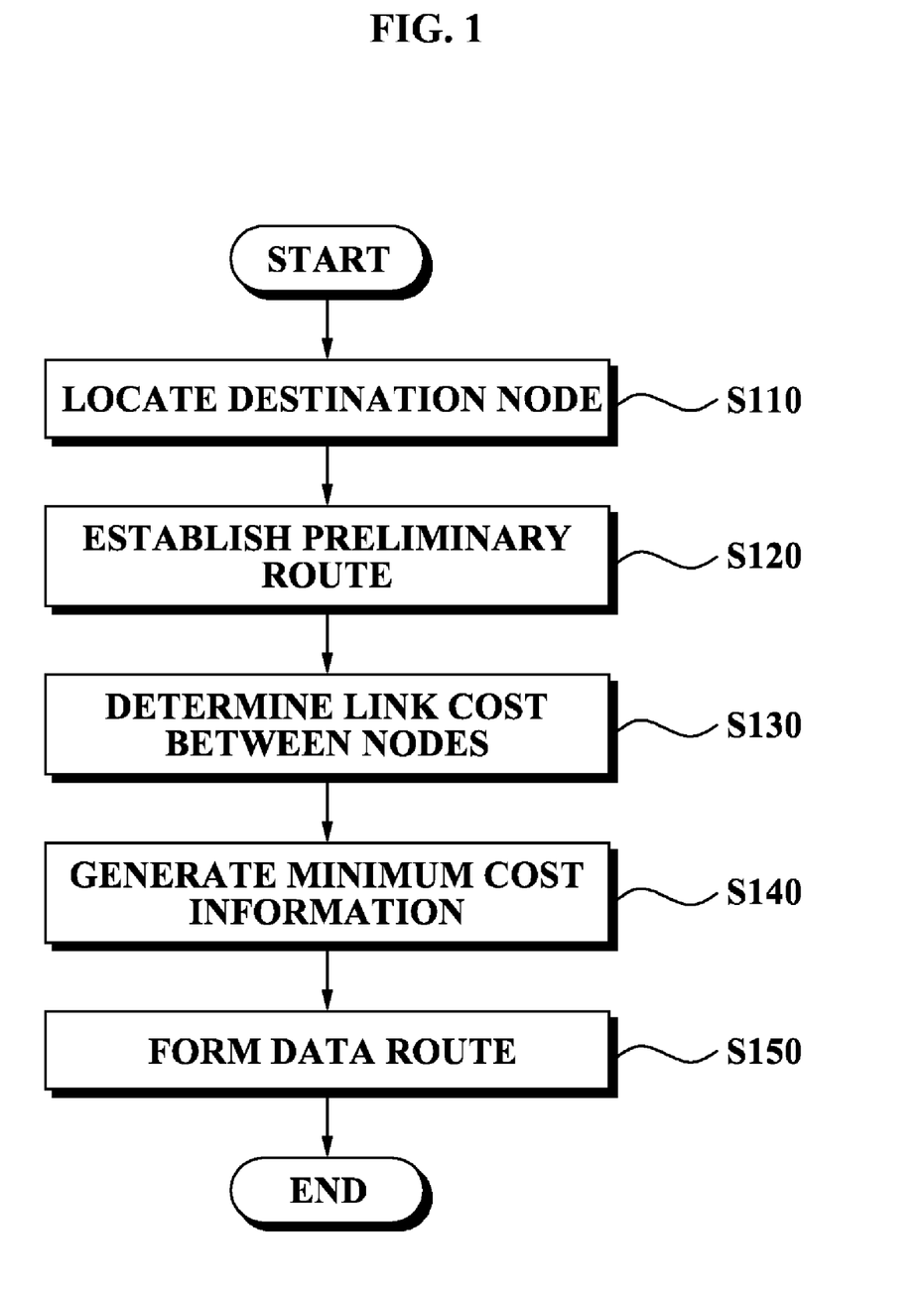
FIG. 1 is a flowchart illustrating a data routing method according to an exemplary embodiment of the present invention.

FIG. 1 is a flowchart illustrating a data routing method according to an exemplary embodiment of the present invention.

Referring to FIG. 1, in operation S110, the data routing method locates a destination node using a destination locating packet. In this instance, the source node broadcasts the destination locating packet, and thus, the destination node may be located.

Specifically, a variety of methods for locating the destination node may exist. For example, the destination node may broadcast the destination locating packet to an entire network. Also, the source node may broadcast the destination locating packet to neighbor nodes, which are located around the source node, and neighbor nodes receiving the destination locating packet may broadcast the destination locating packet to other neighbor nodes again. Accordingly, all nodes located in the network may receive the destination locating packet, and the destination node may receive the destination locating packet.

The destination locating packet may include information in which the source node locates the destination node. Accordingly, the destination locating packet is transmitted to the destination node using any method, and the destination node receiving the destination locating packet recognizes the source node locating the destination node.

In operation S120, the data routing method establishes a preliminary route including anchor nodes based on a route where the destination locating packet is transmitted to the destination node.

Specifically, the source node may directly transmit the destination locating packet to the destination node in a wireless network including a number of nodes. However, the destination locating packet is generally transmitted to the source node via a route including a plurality of nodes. Also, a plurality of routes including the plurality of nodes may exist.

For example, it is assumed three routes from source node S to destination node D exist. It is assumed a first route is a route S-A-B-D, a second route is a route S-A-B-C-D, and a third route is a route S-A-E-F-G-D. That is, the destination locating packet is generally transmitted from source node S to destination node D via the three routes. In this instance, any one of the three routes may be established as the preliminary route. When the first route is selected as the preliminary route, source node S, node A, node B, and destination node D may be anchor nodes. Specifically, the anchor nodes may be considered as a node located on the preliminary route.

In this instance, in operation S120, the preliminary route may be established to include a minimum number of anchor nodes. Specifically, although the three routes which may be the preliminary route exist in the above description, the first route including four anchor nodes may be established as the preliminary route, since the second route includes five anchor nodes and the third route includes six anchor nodes.

In operation S130, the data routing method determines a link cost between neighbor nodes of each of the anchor nodes, and also between the anchor nodes and the neighbor nodes of each of the anchor nodes.

In this instance, the link cost where a link state between the nodes is considered may be determined. The link cost may indicate all costs required for transmitting/receiving a packet via a corresponding link. Particularly, the link cost may be calculated by considering various lower layer information of the network. For example, when based on Institute of Electrical and Electronics Engineers (IEEE) 802.11 b, a Received Signal Strength (RSS), minimum transmission power to be required for transmitting a signal, a Signal to Noise Ratio (SNR), a Queuing Delay, a Link Delivery Ratio, a delay due to a competition on a Media Access Control (MAC) layer may be considered to calculate the link cost.

Each of the anchor nodes may have a plurality of neighbor nodes. In this instance, the neighbor nodes of each of the anchor nodes may be located within a predetermined number of hops from each of the anchor nodes.

Neighbor nodes of each of the anchor nodes may be located within two hops from each of the anchor nodes. For example, when the preliminary route is established to the route S-A-B-D, source node S, node A, node B, and destination node D may be the anchor nodes. In this instance, source node S may have node A and node B as the neighbor node, and node A may have source node S, node B, and destination node D as the neighbor node. Also, each of the anchor nodes may have other nodes excluding the anchor node as the neighbor node.

In operation S130, the link cost between the neighbor nodes of each of the anchor nodes, and also between the anchor nodes and each of the neighbor nodes of the anchor nodes is determined. Specifically, a link cost with respect to links between the neighbor nodes, a link cost between the anchor node and the neighbor nodes, and the like, may be determined.

In operation S140, the data routing method generates minimum cost information with respect to a route consuming a minimum cost from the destination node to a source node using the link cost.

In this instance, in operation S140, the minimum cost information with respect to the route consuming the minimum cost from the destination node to the source node may be generated using a Dijkstra algorithm.

The Dijkstra algorithm is for calculating a shortest route. For example, it is assumed the anchor nodes are aware of the link cost between the neighbor nodes of each of the anchor nodes, and also between the anchor nodes and the neighbor nodes of each of the anchor nodes. In this instance, the neighbor nodes are located within two hops from each of the anchor nodes. Also, a destination node is aware of a link cost between neighbor nodes of the destination node, and also between the destination node and the neighbor nodes of the destination node, since the destination node is included in the anchor node. Also, a source node is aware of a link cost between neighbor nodes of the source node, and also between the source node and the neighbor nodes of the source node, since the source node is included in the anchor node. Hereinafter, a direction from the destination node to the source node refers to an 'uplink direction', and a direction from the source node to the destination node refers to a 'downlink direction'.

In this instance, since the destination node is aware of the link cost between the neighbor nodes of the destination node, and also between the destination node and the neighbor nodes of the destination node, a route consuming the minimum cost from among routes towards each of the neighbor nodes may be ascertained using the Dijkstra algorithm. For example, the destination node may ascertain information about a minimum cost spanning tree (MCST) with respect to neighbor nodes of the destination node using the Dijkstra algorithm.

Accordingly, the destination node may generate first cost information about a route from the destination node to each of the neighbor nodes of the destination node. The first cost information may include information about the link cost between the neighbor nodes of the destination node, and also between the destination node and the neighbor nodes of the destination node, or information about the MCST with respect to the neighbor nodes of the destination node from the destination node.

Then, the destination node may transmit the first cost information to a first anchor node. The first anchor node is adjacent to the destination node and on the uplink direction. Also, since the first anchor node is aware of a link cost between neighbor nodes of the first anchor node, and also between the first anchor node and the neighbor nodes of the first anchor node, second cost information corresponding to updated first cost information may be generated using the first cost information, transmitted from the destination node, and the link cost between the neighbor nodes of the first anchor node, and also between the first anchor node and the neighbor nodes of the first anchor node. In this instance, the second cost information may include information about the link cost between the neighbor nodes of the first anchor node, and also between the first anchor node and the neighbor nodes of the first anchor node or information about an MCST with respect to the neighbor nodes of the first anchor node from the destination node.

Also, the first anchor node transmits the second cost information to a second anchor node. The second anchor node is adjacent to the first anchor node and on the uplink direction. The second anchor node generates third cost information again. Similarly, the third cost information may include information about a link cost between neighbor nodes of the second anchor node, and also between the second anchor node and the neighbor nodes of the second anchor node or information about an MCST with respect to the neighbor nodes of the second anchor node from the destination node.

Through operations described above, the minimum cost information with respect to the route consuming the minimum cost from the destination node to the source node may be generated via the preliminary route including the anchor nodes.

In operation S150, the data routing method forms a data route from the destination node to the source node using the minimum cost information.

Specifically, the source node may ascertain the information about the link cost between the neighbor nodes of each of the anchor nodes, and also between the anchor nodes and the neighbor nodes of each of the anchor nodes via the preliminary route. Specifically, the minimum cost information may include the information about the link cost between the neighbor nodes of each of the anchor nodes, and also between the anchor nodes and the neighbor nodes of each of the anchor nodes. In this instance, the source node may calculate the route consuming the minimum cost using the Dijkstra algorithm.

In this instance, an operation where the source node transmits a route formation packet corresponding to the minimum cost information to the anchor nodes and an operation where the destination node selects the data route by transmitting a reply packet in response to the route formation packet to the source node may be included in operation S150.

Specifically, the source node may transmit a reply formation packet to the destination node via the anchor nodes located on the preliminary route. The reply formation packet corresponds to the minimum cost information, and may include information about nodes included in the route consuming the minimum cost from the destination node to the source node. In this instance, each of the anchor nodes located on the preliminary route reports to each of the nodes, included in the route consuming the minimum cost, to be selected as a node of the data route, in response to the received reply formation packet. Accordingly, each of the anchor nodes including the destination node receives the reply formation packet.

The destination node receiving the reply formation packet transmits a reply packet to the route consuming the minimum cost. In this instance, the nodes included in the route consuming the minimum cost add information about the nodes included in the route consuming the minimum cost to the reply packet, and transmit the reply packet to another node on the uplink direction. Also, a routing table with respect to the nodes included in the route consuming the minimum cost may be generated via the route consuming the minimum cost.

Lastly, the source node receives the reply packet including the information about the nodes included in the route consuming the minimum cost. Accordingly, the destination node and the source node may transmit/receive various data via the route consuming the minimum cost.

Figure 2:
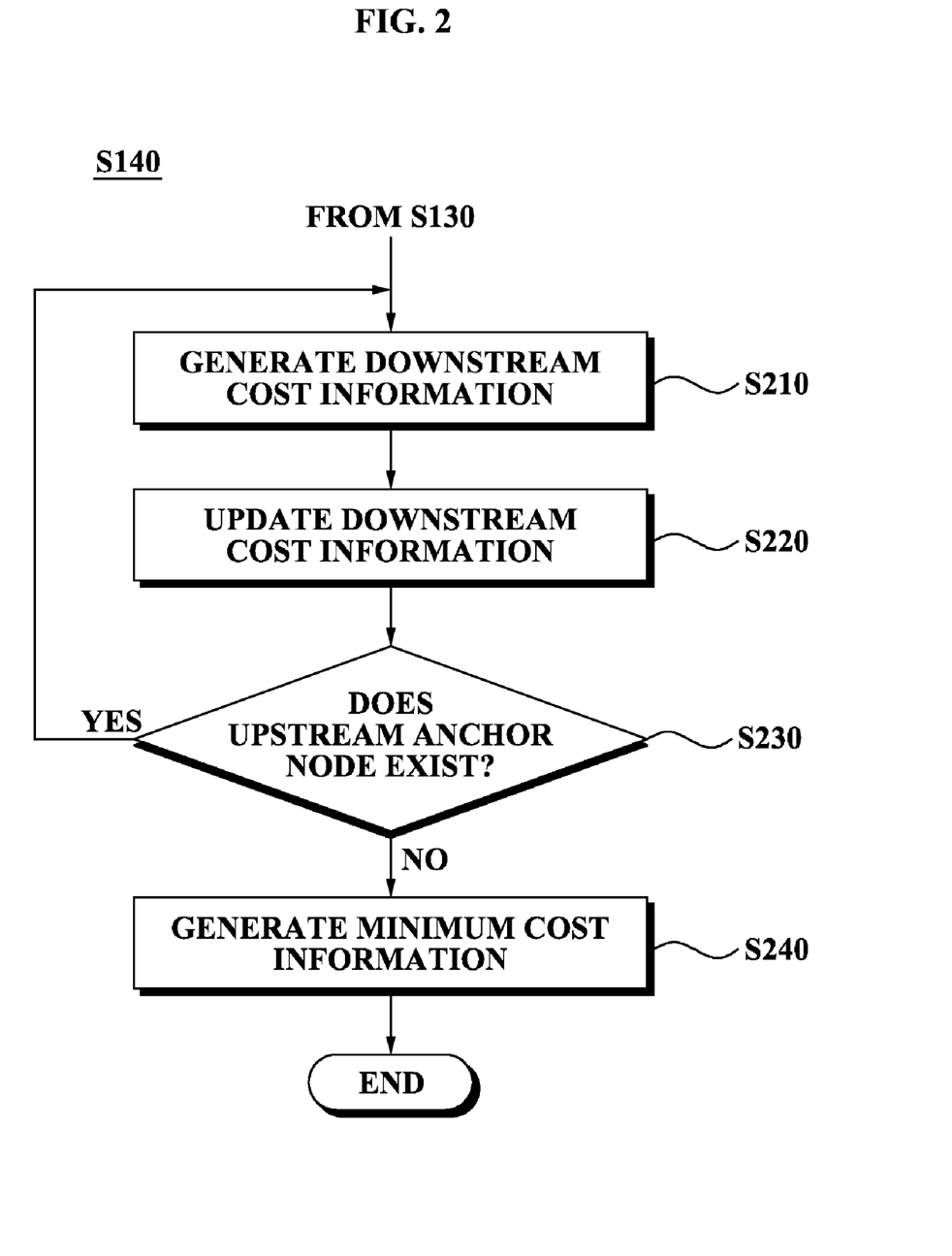
FIG. 2 is a flowchart illustrating operation S140 of FIG. 1 in detail.

FIG. 2 is a flowchart illustrating operation S140 illustrated in FIG. 1 in detail.

Referring to FIG. 2, the generating of the minimum cost information in operation S140 includes operation S210. In operation S210, a downstream anchor node generates downstream cost information using a link cost between neighbor nodes of the downstream anchor node, and also between the downstream anchor node and the neighbor nodes of the downstream anchor node.

In this instance, the downstream anchor node is adjacent to an upstream anchor node in the downlink direction. Conversely, the upstream anchor node is adjacent to the downstream anchor node in the uplink direction.

The generating of the minimum cost information in operation S140 includes operation S220. In operation S220, the upstream anchor node adjacent to the downstream anchor node updates the downstream cost information using a link cost between neighbor nodes of the upstream anchor node, and also between the upstream anchor node and the neighbor nodes of the upstream anchor node.

For example, it is assumed the destination node is the downstream anchor node and the first anchor node is the upstream anchor node. Specifically, the first anchor node is adjacent to the downstream anchor node in the uplink direction. In this instance, the destination node generates the downstream cost information using the link cost between the neighbor nodes of the destination node, and also between the destination node and the neighbor nodes of the destination node. The downstream cost information may include information about the link cost between the neighbor nodes of the destination node, and also between the destination node and the neighbor nodes of the destination node or information about the MCST with respect to the neighbor nodes from the destination node.

In this instance, since the first anchor node is aware of the link cost between the neighbor nodes of the first anchor node, and also between the first anchor node and the neighbor nodes of the first anchor node, the downstream cost information generated from the destination node may be updated. The updated downstream cost information may include information about the link cost between the neighbor nodes of the first anchor node, and also between the first anchor node and the neighbor nodes of the first anchor node or information about the MCST with respect to the neighbor nodes of the first anchor node from the destination node.

The generating of the minimum cost information in operation S140 includes operation S230. In operation S230, after updating the downstream cost information and generating upstream cost information, the upstream anchor node determines whether another upstream anchor node located higher than the upstream anchor node exists. When the other upstream anchor node located higher than the upstream anchor node exists, the generating of the downstream cost information in operation S210 and the updating of the downstream cost information in operation S220 are repeated.

The generating of the minimum cost information in operation S140 includes operation S240. In operation S240, the upstream anchor node generates the minimum cost information by successively updating the downstream cost information. In this instance, the minimum cost information may include information about an MCST from the destination node to the source node.

Specifically, in the above-described example, the second anchor node corresponding to an upstream anchor node of the first anchor node may exist. In this instance, the first anchor node may be the downstream anchor node and the second anchor node may be the upstream anchor node. In this instance, the second anchor node generates another upstream cost information by updating the downstream cost information generated by the first anchor node. When the upstream anchor node successively updates the downstream cost information generated by the downstream anchor node as described above, the minimum cost information may be generated.

Figure 3:
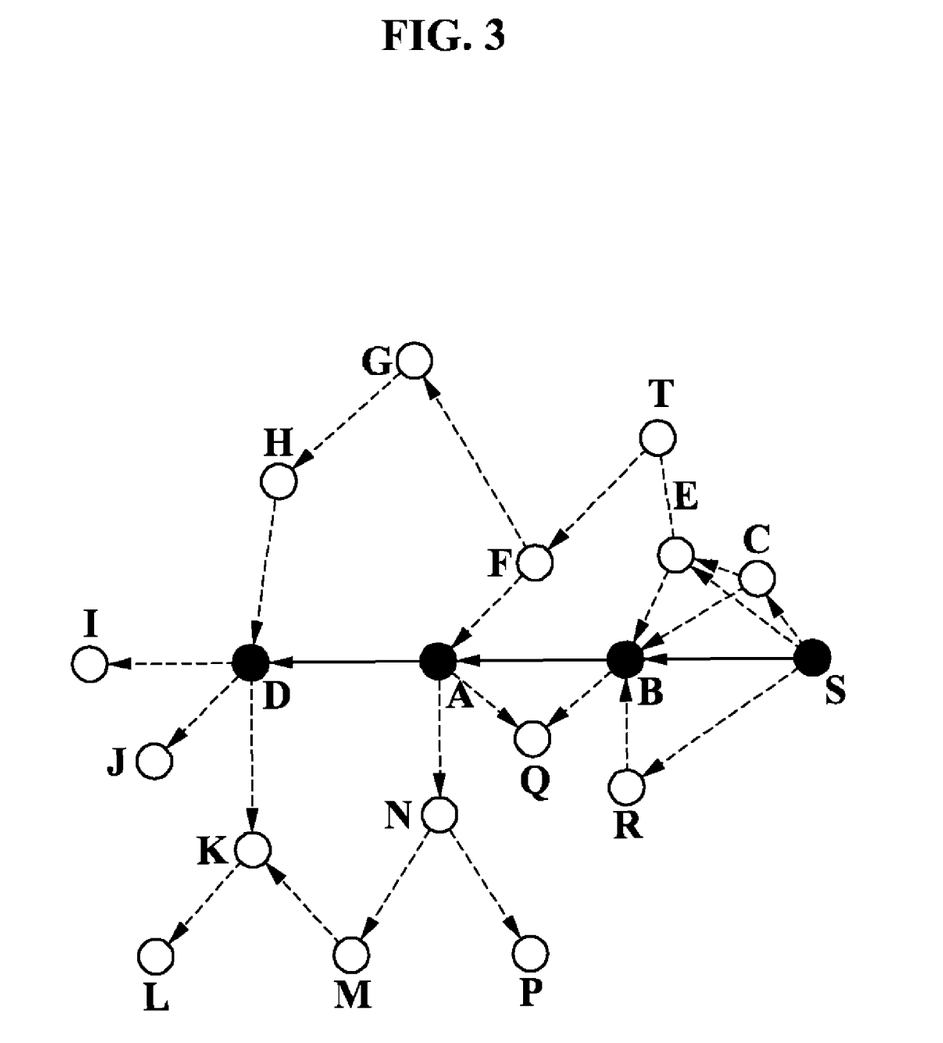
FIG. 3 is a diagram illustrating an example of a network configuration where a preliminary route is established, according to an exemplary embodiment of the present invention.

FIG. 3 is a diagram illustrating an example of a network configuration where a preliminary route is established according to an exemplary embodiment of the present invention.

Referring to FIG. 3, a plurality of nodes exists, and source node S and destination node D are illustrated.

Source node S is required to discover destination node D which is a target of transmitted data before establishing a data route. In this instance, source node S discovers destination node D using a destination locating packet. Specifically, source node S broadcasts the destination locating packet including information in which source node S locates destination node D. The destination locating packet broadcasted from source node S is transmitted to various nodes. The destination locating packet is transmitted to node B, node C, node E, and node R, which is represented by a dotted line in FIG. 3. Node B, node C, node E, and node R receiving the destination locating packet broadcast the destination locating packet again. Specifically, node B broadcasts the destination locating packet to node A and node Q. Also, node C, node E, and node R broadcast the destination locating packet to neighbor nodes. Destination node D receives the destination locating packet through the broadcasting of the destination locating packet described above. Specifically, destination node D receives the destination locating packet from node H, node A, and node K.

In this instance, a plurality of routes from source node S to destination node D may exist. For example, a route D-A-B-S, a route D-H-G-F-T-S, a route D-K-M-N-A-Q-B-R-S, and the like, may exist. In this instance, the preliminary route may be selected to include a minimum number of anchor nodes. Specifically, the preliminary route including the minimum number of anchor nodes is the route D-A-B-S. In this instance, destination node D, node A, the node B, and source node S are the anchor nodes.

Figure 4:
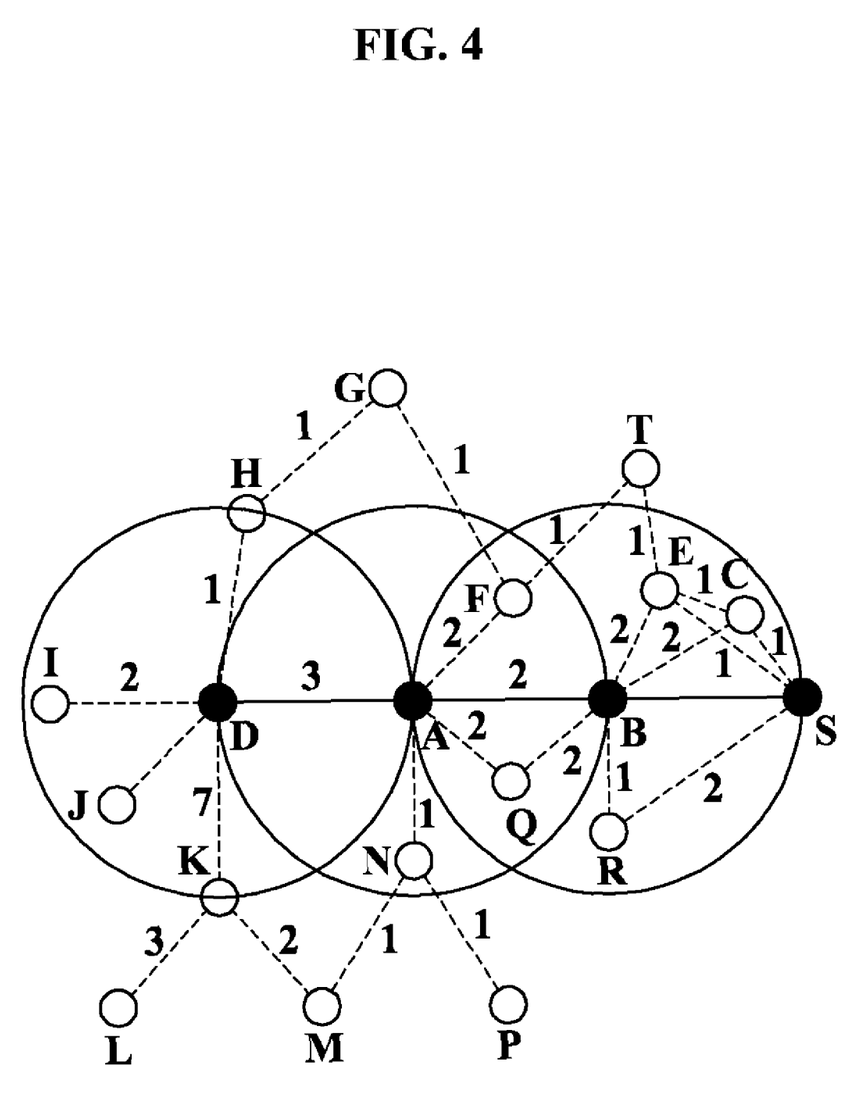
FIG. 4 is a diagram illustrating an example of a network configuration where a link cost is illustrated, according to an exemplary embodiment of the present invention.

FIG. 4 is a diagram illustrating an example of a network configuration where a link cost is illustrated according to an exemplary embodiment of the present invention.

Referring to FIG. 4, neighbor nodes of each anchor node, and a link cost between the neighbor nodes of each of the anchor nodes, and also between the anchor nodes and the neighbor nodes of each of the anchor nodes is illustrated. Node D, node A, node B, and node S are the anchor nodes.

In this instance, node I, node J, node K, node A, and node H correspond to one-hop neighbor nodes of anchor node D. Node G, node F, node N, node M, node L, and node Q correspond to two-hop neighbor nodes of anchor node D. When nodes located within two hops from each of the anchor nodes are established as a neighbor node of each of the anchor nodes, neighbor nodes of anchor node D include node I, node J, node K, node L, node M, node H, node G, node A, node N, node Q, and node F. Also, neighbor nodes of anchor node A include node D, node I, node J, node K, node M, node N, node P, node Q, node B, node R, node S, node E, node F, node I, node G, node H. However, one-hop neighbor nodes of anchor node A include node D, node N, node F, node B, and node Q. Two-hop neighbor nodes of anchor node A include node I, node J, node K, node M, node P, node R, node S, node E, I, and node H. Neighbor nodes of anchor node B include node D, node A, node N, node Q, node F, node I, node E, node C, node S, and node R. Neighbor nodes of anchor node S include node A, node Q, node B, node R, node E, node I, and node C.

In this instance, each of the anchor nodes, that is, node D, node A, node B, and node S, determines a link cost between the neighbor nodes of each of the anchor nodes, and also between the anchor nodes and the neighbor nodes of each of the anchor nodes. For example, anchor node D determines a link cost between the neighbor nodes of anchor node D, and also between anchor node D and the neighbor nodes of anchor node D, for example, D-H, H-G, D-I, D-J, and the like.

In this instance, a link cost consumed between a branch D-G becomes 1+1=2 when following a route D-H-G. Also, a link cost consumed between a branch D-M becomes 7+2=9 when following a route D-K-M. In this instance, information about an MCST of anchor node D is generated as cost information of anchor node D, and transmitted to upstream anchor node A of anchor node D. The information about the MCST of anchor node D is collected by anchor node D.

In this instance, anchor node A updates the cost information of anchor node D using a link cost between the neighbor nodes of anchor node A, and also between anchor node A and the neighbor nodes of anchor node A. The cost information of anchor node D includes the information about the MCST of anchor node D, which is received from anchor node D. Specifically, a route D-M may include to the route D-K-M, a route D-A-N-M, and the like. In this instance, since anchor node A is aware of a link cost consumed between node N and node M, anchor node A may calculate a link cost consumed on the route D-A-N-M, that is, 3+1+1=5. Accordingly, anchor node A ascertains that the link cost consumed by the route D-K-M is greater than the link cost consumed by the route D-A-N-M, and thereby may update the cost information received from anchor node D.

Also, anchor node A may calculate a link cost consumed from destination node D to node T, and ascertain a route consuming a minimum cost. For example, although a plurality of routes may exist in the route from destination node D to node T, the route consuming the minimum cost is calculated as a route D-H-G-F-T using a Dijkstra algorithm. Accordingly, anchor node A may ascertain the route having the minimum cost with respect to each route from destination node D to the neighbor nodes of destination node D. Specifically, anchor node A may ascertain that the route having the minimum cost corresponds to a route D-H-G-F among routes from destination node D to node F, the route D-A-N-M among routes from destination node D to node M, and a route D-A-N-P among routes from destination node D to node P.

In this instance, anchor node A transmits cost information, generated by anchor node A, to anchor node B which is an upstream anchor node of anchor node A. In this instance, anchor node B generates cost information using a link cost between the neighbor nodes of anchor node B, and also between anchor node B and the neighbor nodes of anchor node B. Also, anchor node B transmits cost information to source node S. The cost information includes information about the route consuming the minimum cost among routes from destination node D to the neighbor nodes of anchor node B.

Figure 5:
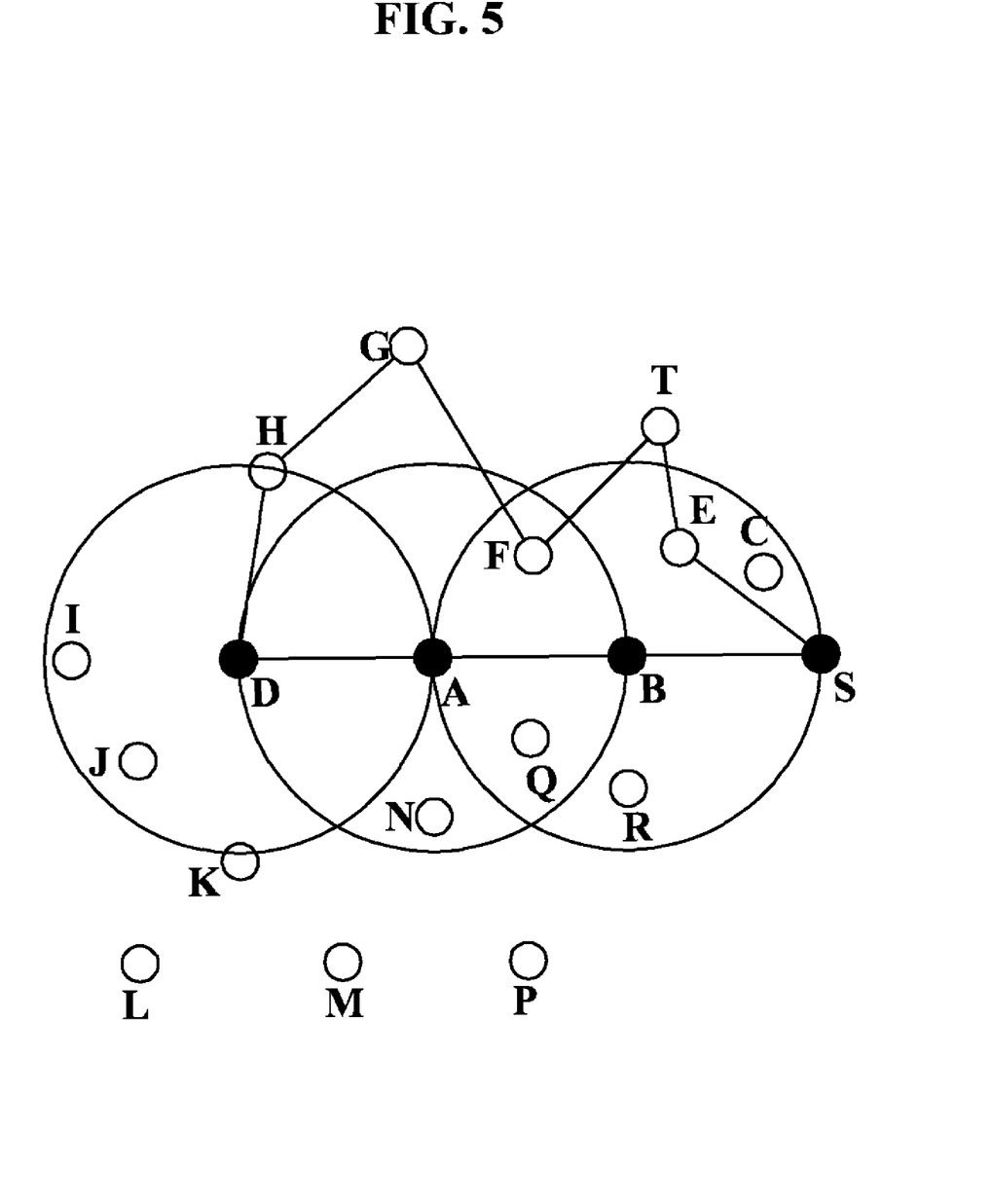
FIG. 5 is a diagram illustrating an example of a network configuration where a data route is established according to an exemplary embodiment of the present invention.

FIG. 5 is a diagram illustrating an example of a network configuration where a data route is established according to an exemplary embodiment of the present invention.

Referring to FIG. 5, a route consuming a minimum cost from among routes from destination node D to source node S using a link cost described with reference to FIG. 4 is illustrated. Specifically, a route D-H-G-F-T-E-S is illustrated as the route consuming the minimum cost, as opposed to a preliminary route, that is, a route D-A-B-S. The route D-H-G-F-T-E-S is established by optimizing a route established based on a minimum hop count.

In this instance, the source node S transmits a route formation packet to anchor nodes, that is, node D, node A, and node B. The route formation packet includes information about the route consuming the minimum cost. Anchor node B receiving the route formation packet transmits the route formation packet to anchor node A corresponding to a neighbor node of anchor node B, and thereby may ascertain which nodes are included in the route consuming the minimum cost.

In this instance, destination node D transmits a reply packet to source node S in response to the route formation packet. In this instance, destination node D may transmit the reply packet via the route D-H-G-F-T-E-S. In this instance, node D, node H, node G, the node F, node T, node E, and node S may form an optimal data route by generating a routing table.

The data routing method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 6:
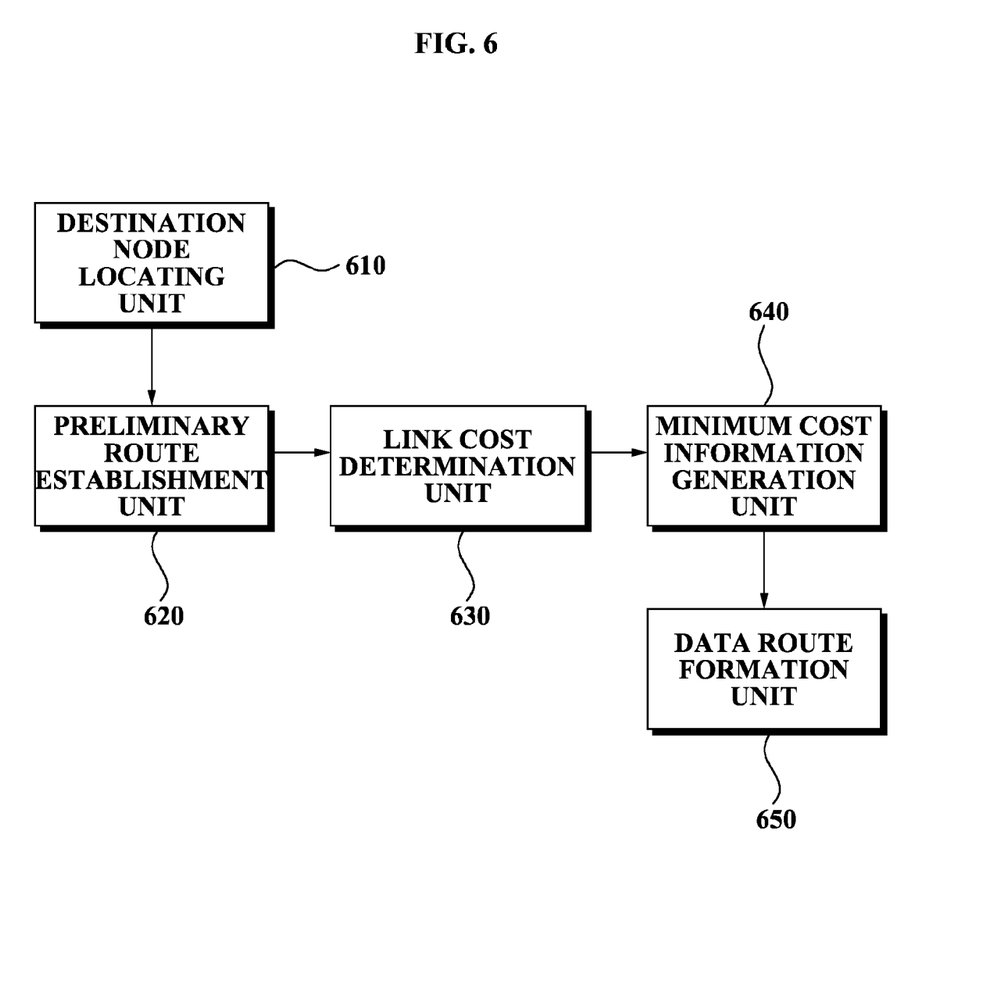
FIG. 6 is a block diagram illustrating a data routing apparatus according to an exemplary embodiment of the present invention.

FIG. 6 is a block diagram illustrating a data routing apparatus according to an exemplary embodiment of the present invention.

Referring to FIG. 6, the data routing apparatus includes a destination node locating unit 610, a preliminary route establishment unit 620, a link cost determination unit 630, a minimum cost information generation unit 640, and a data route formation unit 650.

The destination node locating unit 610 locates a destination node using a destination locating packet.

In this instance, the destination node locating unit 610 may locate the destination node by broadcasting the destination locating packet.

Also, the preliminary route establishment unit 620 establishes a preliminary route including anchor nodes based on a route where the destination locating packet is transmitted to the destination node.

In this instance, the preliminary route establishment unit 620 may establish the preliminary route to include a minimum number of anchor nodes.

Also, the link cost determination unit 630 determines a link cost between neighbor nodes of each of the anchor nodes, and also between the anchor nodes and the neighbor nodes of each of the anchor nodes.

In this instance, the link cost determination unit 630 may determine the link cost where a link state between the nodes is considered.

Also, the minimum cost information generation unit 640 generates minimum cost information with respect to a route consuming a minimum cost from the destination node to a source node using the link cost.

In this instance, the minimum cost information generation unit 640 may generate the minimum cost information with respect to the route consuming the minimum cost from the destination node to the source node using a Dijkstra algorithm.

In this instance, the minimum cost information generation unit 640 may include a downstream cost information generation unit, a downstream cost information updating unit, and a minimum cost information updating unit. The downstream cost information generation unit generates downstream cost information using a link cost between neighbor nodes of a downstream anchor node, and also between the downstream anchor node and the neighbor nodes of the downstream anchor node. The downstream cost information updating unit updates the downstream cost information using a link cost between neighbor nodes of an upstream anchor node, and also between the upstream anchor node and the neighbor nodes of the upstream anchor node. The upstream anchor node is adjacent to the downstream anchor node. The minimum cost information updating unit generates the minimum cost information based on the updated downstream cost information.

Also, the data route formation unit 650 establishes a data route from the destination node to the source node using the minimum cost information.

In this instance, the data route formation unit 650 may include a route formation packet transmission unit and a data route selection unit. The route formation packet transmission unit transmits a route formation packet corresponding to the minimum cost information to the anchor nodes. The data route selection unit selects the data route by transmitting a reply packet in response to the route formation packet to the source node.

In this instance, the neighbor nodes of each of the anchor nodes are located within a predetermined number of hops from each of the anchor nodes.

Descriptions with respect to the data routing apparatus illustrated in FIG. 6 which are the same as the descriptions made with reference to FIG. 1 through FIG. 5 are omitted for conciseness.

According to the present invention, there is provided a data routing method and apparatus which establishes an optimal data route by considering a link cost.

Also, according to the present invention, there is provided a data routing method and apparatus which establishes a route consuming a minimum link cost as a data route, and thereby may establish an optimal data route.

Also, according to the present invention, there is provided a data routing method and apparatus which calculates a minimum cost spanning tree (MCST) using a Dijkstra algorithm, transmits the MCST to a neighbor anchor node, enables a source node to have the MCST expanded to a destination node, and thereby may efficiently optimize a data route.

Also, according to the present invention, there is provided a data routing method and apparatus which considers a link cost between nodes within a predetermined range, and thereby may reduce an overhead which occurs while optimizing a data route.

Also, according to the present invention, there is provided a data routing method and apparatus which consumes a minimum energy to optimize a data route, and thereby may establish an optimal data route using a small amount of energy.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A data routing method, comprising:
    locating a destination node using a destination locating packet;
    establishing a preliminary route comprising anchor nodes, based on a route where the destination locating packet is transmitted to the destination node;
    determining link costs between neighbor nodes of each of the anchor nodes, and also between the anchor nodes and the neighbor nodes of each of the anchor nodes;
    generating minimum cost information with respect to a route consuming a minimum cost from the destination node to a source node, using the link costs; and
    forming a data route from the destination node to the source node using the minimum cost information,
    wherein the generating of the minimum cost information comprises:
    generating, by a downstream anchor node of the anchor nodes in the preliminary route, downstream cost information using link costs between neighbor nodes of the downstream anchor node, and between the downstream anchor node and the neighbor nodes of the downstream anchor node;
    transmitting, by the downstream anchor node, the downstream cost information to a first upstream anchor node of the anchor nodes in the preliminary route;
    updating, by the first upstream anchor node, the downstream cost information using link costs between neighbor nodes of the first upstream anchor node, and between the first upstream anchor node and the neighbor nodes of the first upstream anchor node, the first upstream anchor node being adjacent to the downstream anchor node and being in an uplink direction from the downstream anchor node; and
    transmitting, by the first upstream anchor node, the updated downstream cost information to a second upstream anchor node of the anchor nodes in the preliminary route, the second upstream anchor node being adjacent to the first upstream anchor node and being in the uplink direction from the first upstream anchor node.

2. The data routing method of claim 1, wherein the generating of the minimum cost information generates the minimum cost information with respect to the route consuming the minimum cost from the destination node to the source node, using a Dijkstra algorithm.

3. The data routing method of claim 1, wherein the generating of the minimum cost information further comprises:
    generating, by the second upstream anchor node, the minimum cost information by successively updating the downstream cost information.

4. The data routing method of claim 1, wherein the neighbor nodes of each of the anchor nodes are located within a predetermined number of hops from each of the anchor nodes.

5. The data routing method of claim 4, wherein the neighbor nodes of each of the anchor nodes are located within two hops from each of the anchor nodes.

6. The data routing method of claim 1, wherein the determining of the link costs determines a link cost where a link state between nodes is considered.

7. The data routing method of claim 1, wherein the forming of the data route comprises:
    transmitting, by the source node, a route formation packet corresponding to the minimum cost information to the anchor nodes; and
    selecting, by the destination node, the data route by transmitting a reply packet in response to the route formation packet to the source node.

8. The data routing method of claim 1, wherein the establishing of the preliminary route establishes the preliminary route to include a minimum number of anchor nodes.

9. The data routing method of claim 1, wherein the locating of the destination node locates the destination node by broadcasting the destination locating packet by the source node.

10. A non-transitory computer-readable recording medium storing a program for implementing a data routing method, the data routing method comprising:

locating a destination node using a destination locating packet;

establishing a preliminary route comprising anchor nodes, based on a route where the destination locating packet is transmitted to the destination node;

determining link costs between neighbor nodes of each of the anchor nodes, and between the anchor nodes and the neighbor nodes of each of the anchor nodes;

generating minimum cost information with respect to a route consuming a minimum cost from the destination node to a source node, using the link costs; and forming a data route from the destination node to the source node using the minimum cost information, wherein the generating of the minimum cost information comprises:

generating, by a downstream anchor node of the anchor nodes in the preliminary route, downstream cost information using link costs between neighbor nodes of the downstream anchor node, and between the downstream anchor node and the neighbor nodes of the downstream anchor node;

transmitting, by the downstream anchor node, the downstream cost information to a first upstream anchor node of the anchor nodes in the preliminary route;

updating, by the first upstream anchor node, the downstream cost information using link costs between neighbor nodes of the first upstream anchor node, and between the first upstream anchor node and the neighbor nodes of the first upstream anchor node, the first upstream anchor node being adjacent to the downstream anchor node and being in an uplink direction from the downstream anchor node; and transmitting, by the first upstream anchor node, the updated downstream cost information to a second upstream anchor node of the anchor nodes in the preliminary route, the second upstream anchor node being adjacent to the first upstream anchor node and being in the uplink direction from the first upstream anchor node.

11. A data routing apparatus, comprising:

a destination node locating unit which locates a destination node, using a destination locating packet;

a preliminary route establishment unit which establishes a preliminary route comprising anchor nodes, based on a route where the destination locating packet is transmitted to the destination node;

a link cost determination unit which determines link costs between neighbor nodes of each of the anchor nodes, and between the anchor nodes and the neighbor nodes of each of the anchor nodes;

a minimum cost information generation unit which generates minimum cost information with respect to a route consuming a minimum cost from the destination node to a source node, using the link costs; and a data route formation unit which establishes a data route from the destination node to the source node using the minimum cost information, wherein the minimum cost information generation unit comprises:

a downstream cost information generation unit which generates downstream cost information using link costs between neighbor nodes of a downstream anchor node of the anchor nodes in the preliminary route, and between the downstream anchor node and the neighbor nodes of the downstream anchor node wherein the downstream cost information is transmitted from the downstream anchor node to a first upstream anchor node of the anchor nodes in the preliminary route;

a downstream cost information updating unit which updates the downstream cost information using link costs between neighbor nodes of the first upstream anchor node, and between the first upstream anchor node and the neighbor nodes of the first upstream anchor node, the first upstream anchor node being adjacent to the downstream anchor node and being in an uplink direction from the downstream anchor node, where the updated downstream cost information is transmitted from the first upstream anchor node to a second upstream anchor node of the anchor nodes in the preliminary route, the second upstream anchor node being adjacent to the first upstream node and being in the uplink direction from the first upstream anchor node.

12. The data routing apparatus of claim 11, wherein the minimum cost information generation unit generates the minimum cost information with respect to the route consuming the minimum cost from the destination node to the source node, using a Dijkstra algorithm.

13. The data routing apparatus of claim 11, wherein the minimum cost information generation unit further comprises:

a minimum cost information updating unit which generates the minimum cost information based on a downstream cost information updated in the second upstream anchor node.

14. The data routing apparatus of claim 11, wherein the neighbor nodes of each of the anchor nodes are located within a predetermined number of hops from each of the anchor nodes.

15. The data routing apparatus of claim 14, wherein the neighbor nodes of each of the anchor nodes are located within two hops from each of the anchor nodes.

16. The data routing apparatus of claim 11, wherein the link cost determination unit determines a link cost where a link state between nodes is considered.

17. The data routing apparatus of claim 11, wherein the data route formation unit comprises:

a route formation packet transmission unit which transmits a route formation packet corresponding to the minimum cost information to the anchor nodes; and a data route selection unit which selects the data route by transmitting a reply packet in response to the route formation packet to the source node.

18. The data routing apparatus of claim 11, wherein the preliminary route establishment unit establishes the preliminary route including a minimum number of anchor nodes.

19. The data routing apparatus of claim 11, wherein the destination node locating unit locates the destination node by broadcasting the destination locating packet.

* * * * *